(12) United States Patent
Misirian

(10) Patent No.: US 10,570,018 B2
(45) Date of Patent: Feb. 25, 2020

(54) METHOD OF PRODUCTION OF CO2 USING LIME TO LIMESTONE CHEMICAL REACTION

(71) Applicant: Hagop Jake Misirian, Santa Ana, CA (US)

(72) Inventor: Hagop Jake Misirian, Santa Ana, CA (US)

( * ) Notice: Subject to any disclaimer, the term of this patent is extended or adjusted under 35 U.S.C. 154(b) by 0 days.

(21) Appl. No.: 15/483,377

(22) Filed: Apr. 10, 2017

(65) Prior Publication Data

US 2018/0290892 A1 Oct. 11, 2018

(51) Int. Cl.
| | | |
|---|---|---|
| *C01B 32/00* | (2017.01) | |
| *B01D 53/00* | (2006.01) | |
| *C01B 32/50* | (2017.01) | |
| *B01D 53/62* | (2006.01) | |
| *B01D 53/83* | (2006.01) | |
| *B01D 53/96* | (2006.01) | |
| *B01J 19/22* | (2006.01) | |
| *B01J 10/00* | (2006.01) | |
| *B01D 53/82* | (2006.01) | |

(52) U.S. Cl.
CPC ............... *C01B 32/50* (2017.08); *B01D 53/62* (2013.01); *B01D 53/82* (2013.01); *B01D 53/83* (2013.01); *B01D 53/96* (2013.01); *B01J 10/00* (2013.01); *B01J 19/22* (2013.01); *B01D 2251/404* (2013.01); *B01D 2251/604* (2013.01); *B01D 2251/606* (2013.01); *B01D 2256/22* (2013.01); *B01D 2257/504* (2013.01); *B01D 2258/06* (2013.01); *B01D 2259/128* (2013.01); *C01B 2210/0003* (2013.01)

(58) Field of Classification Search
CPC ........ C01B 32/50; B01D 53/62; B01D 53/83; B01D 53/96
USPC .................................................. 423/176, 438
See application file for complete search history.

(56) References Cited

U.S. PATENT DOCUMENTS

| | | | | |
|---|---|---|---|---|
| 4,259,081 A | * | 3/1981 | Reuter .................... | C04B 2/108 23/293 R |
| 4,748,010 A | * | 5/1988 | Walker .................... | C04B 2/10 423/175 |
| 2014/0161708 A1 | * | 6/2014 | Stamp .................... | C01B 31/20 423/438 |

* cited by examiner

*Primary Examiner* — Sikarl A Witherspoon

(57) ABSTRACT

Production of lime (calcium oxide: CaO) from limestone ($CaCO_3$) is one of the oldest natural chemical processes and this process is reversible, per FIG. 4 ($CaCO_3 \rightarrow CaO+CO_2$ under 500 to 600° C. heat). Subsequently when lime is exposed to the moving air; carbon dioxide ($CO_2$) in the air will react with the lime and lime will convert back to limestone. By repeating same limestone to lime chemical process, lime and carbon dioxide ($CO_2$) will be created. After separating and storing the carbon dioxide ($CO_2$), process will be repeated continuously, using the same lime.

2 Claims, 5 Drawing Sheets

Prof. Shakhashiri     www.scifun.org     Chemistry 103-1

Chemical of the Week

LIME: CALCIUM OXIDE — CaO

Calcium oxide is a white crystalline solid with a melting point of 2572°C. It is manufactured by heating limestone, coral, sea shells, or chalk, which are mainly $CaCO_3$, to drive off carbon dioxide.

$$CaCO_3(s) \xrightarrow{500-600^\circ C} CaO(s) + CO_2(g)$$

This reaction is reversible: calcium oxide will react with carbon dioxide to form calcium carbonate. The reaction is driven to the right by flushing carbon dioxide from the mixture as it is released.

The production of calcium oxide from limestone is one of the oldest chemical transformations produced by man. Its use predates recorded history. Most ancient languages have a word for calcium oxide. In Latin it is *calx*, from which the name of the element calcium is taken. In Old English, its name is *lim*, which is the origin of the modern commercial name for calcium oxide, namely lime. The abundance of limestone in the Earth's crust and the ease of its transformation to calcium oxide do not alone explain why the lime is one of the oldest products of chemistry. Lime has many properties that make it quite valuable. It is so useful that it is today produced industrially on a vast scale; over 22 million tons were produced in the U.S. in 2000.

The oldest uses of lime exploit its ability to react with carbon dioxide to regenerate calcium carbonate. When lime is mixed with water and sand, the result is mortar, which is used in construction to secure bricks, blocks, and stones together. Mortar is initially a stiff paste that is laid between the bricks. It gradually hardens, cementing the bricks together. At room temperature, the reaction of lime with carbon dioxide is very slow. It is speeded by mixing lime with water. When lime is mixed with water, it forms calcium hydroxide, called slaked lime.

$$CaO(s) + H_2O(l) \longrightarrow Ca(OH)_2(s)$$

The reaction of calcium hydroxide with carbon dioxide is faster, producing a mortar that hardens more quickly.

$$Ca(OH)_2(s) + CO_2(g) \longrightarrow CaCO_3(s) + H_2O(l)$$

Figure-4

METHOD OF PRODUCTION OF CO2 USING LIME TO LIMESTONE CHEMICAL REACTION

1. INTRODUCTION

Figure 1:
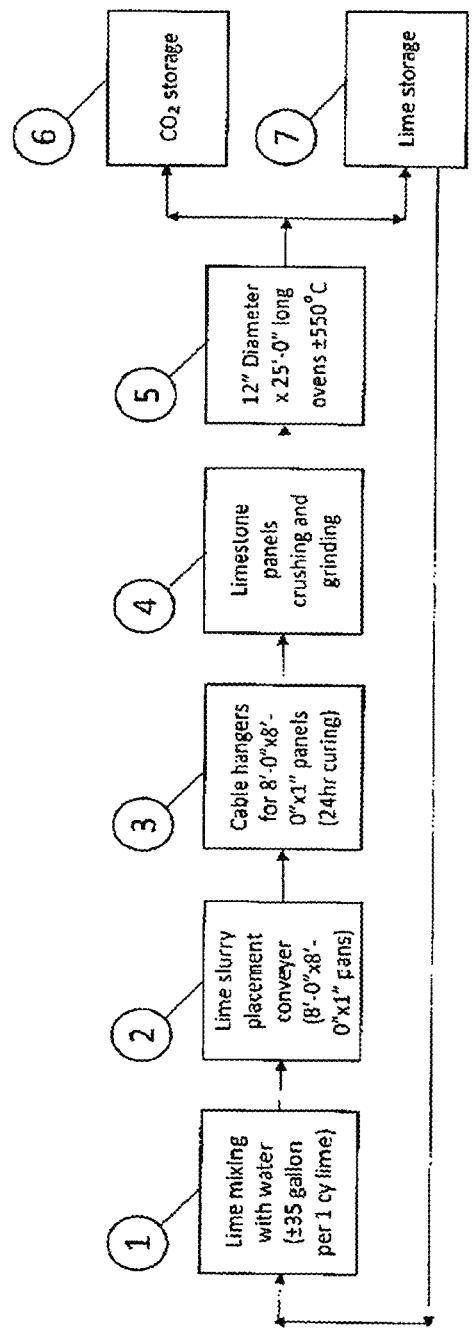

I, Hagop Misirian, citizen of the United State of America, residing in the city of Santa Ana, Calif., have invented a new and useful method for the production of carbon dioxide ($CO_2$), as per one-line diagram (FIG. 1).

The main intent or use of this invention; method of mass production of carbon dioxide ($CO_2$); is by mixing with hydrogen ($H_2$), can be used in production of methanol and produced methanol can be converted in to a hydrocarbon fuel that is equivalent to regular unleaded gasoline.

The method of creating a methanol by mixing $CO_2$ and $H_2$ with high pressure and high temperature was filed as a separate patent (application Ser. No. 15/488,844) by me (Hagop Misirian).

This document describes a method for mass production of carbon dioxide ($CO_2$) from an ambient air, utilizing a limestone to lime chemical reaction.

2. DESCRIPTION

Figure 2:
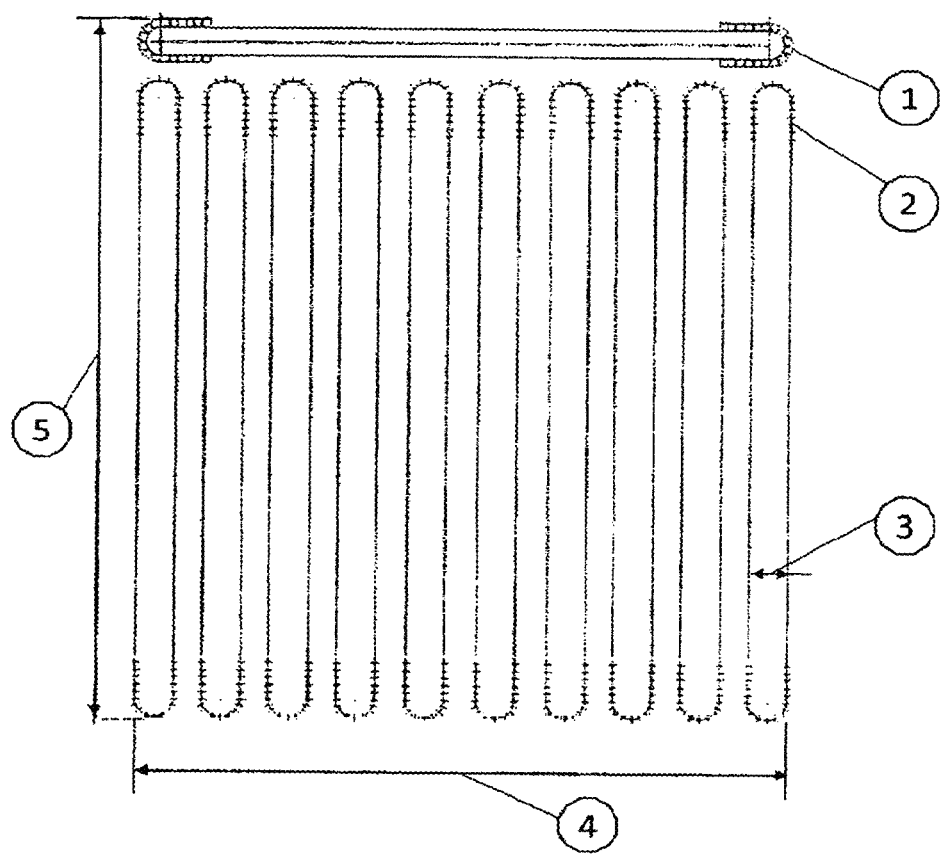

As per common knowledge chemical formula (see FIG. 4), $CaCO_3 \rightarrow CaO + CO_2$ under 500 to 600° C. heat, limestone start releasing carbon dioxide and converting to a lime. Additionally this process is reversible or when lime is in contact with the air, carbon dioxide in the air, start reacting with the lime and lime start converting back to limestone. Subsequently it is posable to remove carbon dioxide from the ambient air, by using this same theory; allowing lime to react with the carbon dioxide in the air, absorbing it and after lime converting back to limestone, newly created limestone under the heat, converted back to lime and carbon dioxide; capturing carbon dioxide and storing. To speed up this process/reaction between carbon dioxide ($CO_2$) within the ambient air and with the lime, first lime is mixed with a water, 32 to 39 gallons of water per 1 cubic yard of lime, creating a lime slurry. Newly created lime slurry poured into a specially designed conveyor pans, 8 feet by 8 feet and 1 inch thick, comprising with 18 gage stainless steel sheet metal, suitable for standard conveyer use (FIG. 2, item-1). Chains, comprising of ten gage stainless steel, will be placed (downwards direction about six inches on center) prior to pouring the lime slurry. Chains, in this case, act as an enforcement for the lime panels and allowing for the lime panels to move from point to point, specifically allowing to use magnetic holders to move the panels from conveyor to the cable hangers (FIG. 2, item-2) without separating a part.

Figure 5:
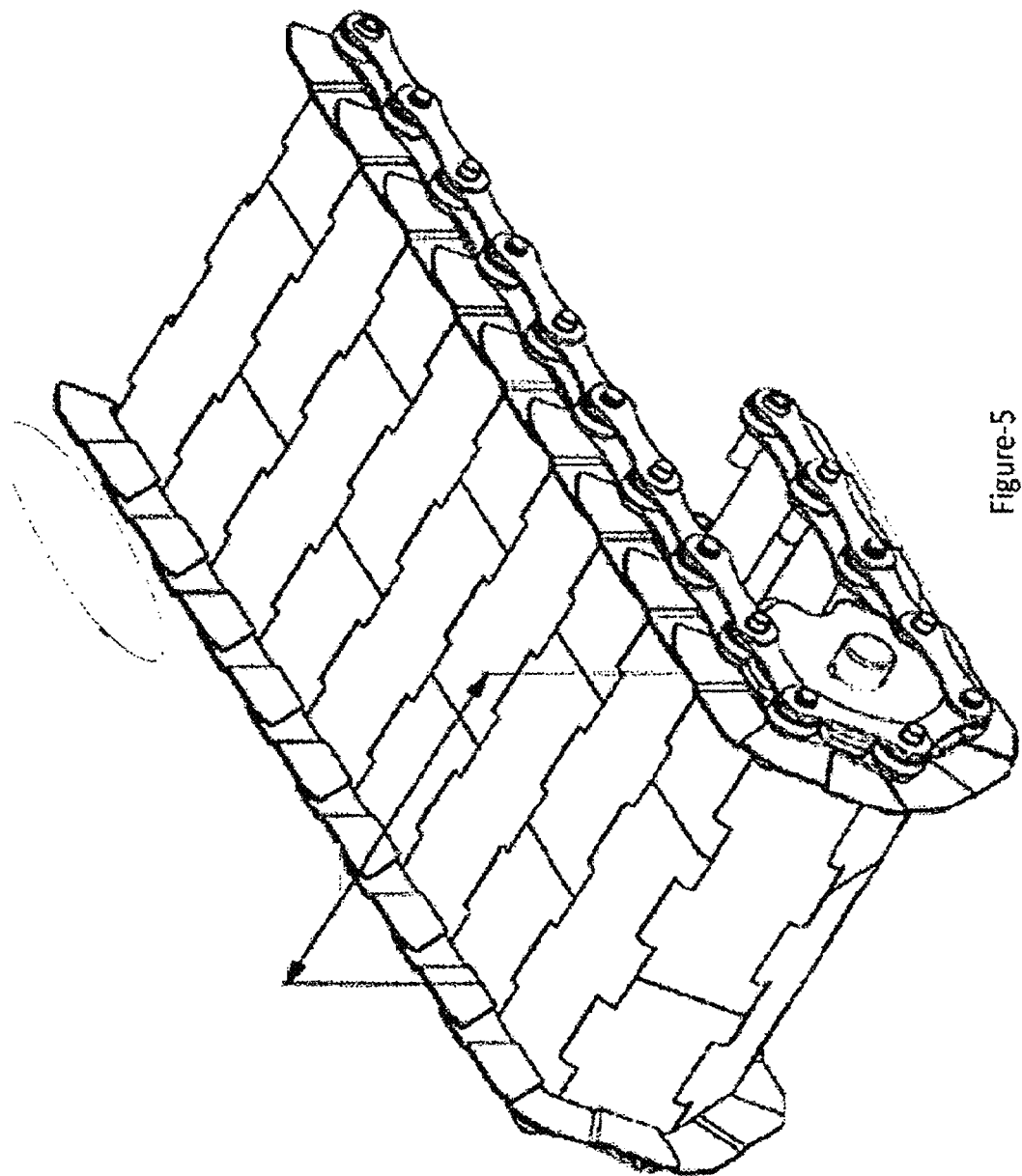

In FIG. 5: illustrating a typical conveyer (eight feet three inches wide), option-1; where lime slurry pans can be put on top of the moving conveyer or conveyer belt and remove. Option-2; where lime slurry pans are fixed and part of the conveyer.

Figure 3:
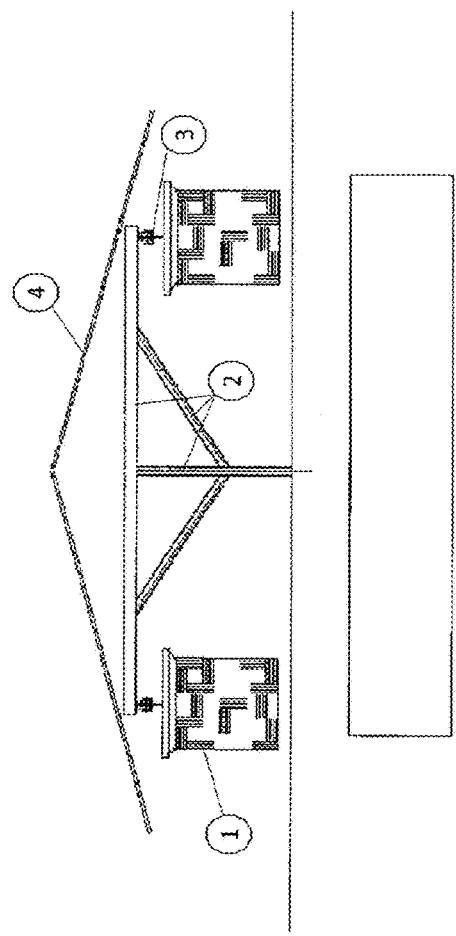

Lime slurry will harden within one hour. The hardened slurry panels moved from the conveyor to cable hangers and hanged 12 feet on center. Moving cable hangers will provide fresh air contact with the hardened lime panels. This apparatus is illustrated in FIG. 2, Item-2 and FIG. 3; it is a steel structure with cover that will protect panels from the rain (FIG. 3). Optional enclosed environment with dust free and heated air (about 55 F) can be provided for this steel structure or cable hangers, which will prolong reusing the same lime. About 24 hours exposure to the air, lime panels saturating with a carbon dioxide ($CO_2$), the lime converting back in to a limestone, gaining about 4000 psi compressive strength.

At this stage, limestone panels will be crushed. Limestone separate from the chain and after grinding, filled into a container, comprising of 12 inches diameter, 25 feet high stainless steel 40 schedule pipe; wrapped around with electrical heating coils and renewable electrical power source will be used in this case. Those ovens can be constructed per special orders, designed by an electric oven manufacturing companies. Containers will be equipped with the ability to provide powdered limestone to be dried first under 200 to 300° C. heat, capturing the water vapors. After air and water vapors are removed, the container will be covered and heating process will continue (500 to 600° C.). At this stage, limestone will start turning back to lime and carbon dioxide ($CO_2$) as per formula in FIG. 4. After carbon dioxide ($CO_2$) removal and storage the lime will be reused and process will be repeated continuously per FIG. 1.

4. SUMMARY OF THE INVENTION

This method does not need catalyst and does not create leftover byproducts.

In FIG. 2, item-4 and item-5 show about 1000'-0"x1000'-0" or 25-acre lot can support 10 cable hanger loops (item-2) and each loop can support 1600 panels at 12 feet on center. Assuming that one complete cycle can be accomplished in 24 hours (optimum duration of complete cycle will be determined later), which amounts to 6.4 million pounds of lime converted to limestone per day. For methanol production of 1.5 million gallon per day, about 5 million pounds of lime is needed to process each day.

LIST OF FIGURES AND BRIEF DESCRIPTION

FIG. 1: One-line diagram for production of carbon dioxide ($CO_2$).

FIG. 2: Diagram detailing the conveyor for pans (dimensions: 8 feet by 8 feet and 1 inch thick) in which lime slurry will be poured and create lime panels. Then lime panels moved and hanged from cable hangers to encounter a moving fresh air.

Item-1: Plan view of conveyor with 8 feet by 8 feet and 1-inch thick pans.
Item-2: Depicts 10 cable hanger loops that lime panels will be hanged 12 feet on center
Item-3: Details the overall distance (face to face) for each hanger loop (36 feet.)
Item-4: Details the distance between the first and tenth loop (about 1000 feet).
Item-5: Details the length of each hanger loop with conveyor loop (about 1000 feet).

FIG. 3: Diagram detailing the cable hanger apparatus structure/support, installed about 100 feet on center. It is a steel structure with cover that will protect panels from the rain.

Item 1: Details the 8 feet by 8 feet and 1-inch thick lime panels, which hanged from moving cables
Item 2: Depicts the structural support elements that support the moving cable hangers
Item 3: Depicts the moving cable
Item 4: Depicts the cover placed over the apparatus to protect the lime panels from rain or other falling hazards.

FIG. 4: Screenshot taken from www.scifun.org, detailing the specifics of the reaction from calcium carbonate to calcium oxide and carbon dioxide.

FIG. 5: Illustrating a typical conveyer (eight feet three inches wide), option-1 where lime slurry pans can be put on top of the moving conveyer and remove. Option-2 where lime slurry pans are fixed and part of the conveyer.

The invention claimed is:

1. A method for mass production of carbon dioxide comprising the use of a reverse, limestone to lime reaction, $CaCO_3 \rightarrow CaO+CO_2$ at 500 to 600° C. and reversed $CaO+CO_2 \rightarrow CaCO_3$, to remove carbon dioxide from the ambient air, wherein lime is mixed with a water at about 35 gallons of water per 1 cubic yard of lime, creating a lime slurry; pouring the lime slurry into specially designed conveyor pans; wherein chains comprised of stainless steel wires are placed downwards, about six inches on center, into the pan, prior to pouring the lime slurry; wherein the lime slurry reacts with carbon dioxide in the ambient air and starts to harden in about one hour; then by use of a magnetic holders, lime panels moved from the pans at the conveyor to the moving cable hangers; wherein after about 24 hours, the lime panels convert back to limestone, gains about 4000 psi compressive strength; crushing the newly created limestone panels, separating said limestone from the chains and after grinding said limestone panels, filling a containers comprising a 12 inch diameter, 25 feet high stainless steel pipe wrapped with electrical heating coils; wherein container further comprises a means for drying powdered limestone at a temperature in the range of 200 to 300° C.; capturing water vapor and then continuing the heating process at a temperature range of 500 to 600° C., allowing the limestone to turn back into lime, thereby creating a carbon dioxide during the process; separating the carbon dioxide from the lime; storing the carbon dioxide in an appropriate tank, and then recycling the lime to the mixing area to be mixed with water and repeat the process.

2. A conveyor pan for the mass production of carbon dioxide according to claim 1, comprising an 8 feet by 8 feet by 1 inch thick stainless steel sheet metal, suitable for standard conveyer use; chains, comprised of stainless steel wires placed downwards, about six inches on center in to the pan, prior pouring the lime slurry; further comprising magnetic holders to move lime panels from pens at the conveyor to a moving cable hanger.

* * * * *